Patented July 23, 1940

2,208,581

UNITED STATES PATENT OFFICE 2,208,581

PROCESS FOR THE PRODUCTION OF SURFACE-ACTIVE SULPHONATES

Johan Marius Hoeffelman, Amsterdam, Netherlands, assignor to Shell Development Company, San Francisco, Calif., a corporation of Delaware No Drawing. Application June 27, 1938, Serial No. 216,170. In the Netherlands July 21, 1937

15 Claims. (Cl. 260—456)

The present invention relates to a process for the production of surface-active sulphonates. More particularly, the invention relates to a process for the production of sulphonic acid esters of polyhydroxy alcoholic compounds and hydroxy sulphonium sulphonates which compounds possess varying degrees of surface activity.

In contradistinction to most other acids, it is known that sulphonic acids, under the customary conditions for esterification, react very slowly, if at all, with alcoholic compounds to form the corresponding esters. In the production of sulphonic acid esters it is, therefore, usually the practice to first convert the sulphonic acid to the sulphonic acid chloride by means of $PCl_5$. The alcoholic compound may then usually be esterified with the sulphonic acid chloride according to the usual procedure.

An object of the present invention is to provide a method whereby sulphonic acid esters of polyhydroxy alcoholic compounds may be produced directly from the sulphonic acids.

Another object of the invention is to provide a method whereby useful surface-active and toxic agents may be produced in a practical and efficient manner. Another object of the invention is to convert cheap sulphonic acids, obtained as a by-product in the refining of petroleum and like products, into useful surface-active agents. Still another object of the invention is to provide an improved method for the production of hydroxy sulphonium sulphonates.

According to the present invention sulphonic acid esters of polyhydroxy alcoholic compounds are prepared by reacting a free sulphonic acid with a compound containing an olefine oxide group.

By a compound containing an olefine oxide group is meant any compound containing the structural grouping

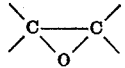

As typical examples of applicable compounds may be mentioned glycerine epi-chlorhydrin, glycide alcohol, ethylene oxide, propylene oxide, butene-2 oxide, butene-1 oxide, isobutylene oxide, butadiene oxide, butadiene di-oxide, chloroprene oxide, isoprene oxide, decene oxide, styrene oxide, cyclohexylene oxide, cyclopentene oxide, etc.

In the present process any of the sulphonic acids may be used. Thus, the sulphonic acid may be substituted or unsubstituted, aliphatic, cyclic, or alicyclic in character and may be a single compound or a mixture. Examples of suitable sulphonic acids are p-toluene sulphonic acid, benzene sulphonic acid, beta-naphthalene sulphonic acid, hydrogenated naphthalene sulphonic acid, hydroxymethane sulphonic acid, cyclohexanone sulphonic acid, meta di-sulphonic acid, acetone sulphonic acid, o-sulphobenzoic acid, sulphanilic acid, cetyl benzene sulphonic acid, dodecyl sulphonic acid, ethionic acid, chlorethyl sulphonic acid, propionaldehyde sulphonic acid, taurine, benzyldehyde sulphonic acid, chlorbenzene sulphonic acid, and sulphonic acids derived from mineral oils.

Since olefine oxide compounds are relatively easily hydrated to their corresponding glycol compounds in the presence of water, and since the glycolic compounds do not react readily with the various sulphonic acids, it is desirable in the process of the present invention that the reaction be executed in the substantial absence of water, i. e., not enough water should be present to convert any appreciable percentage of the olefine oxide used to the glycol. Obviously, traces of water do no appreciable harm.

The above reaction may also be utilized to produce surface-active agents of somewhat different structure. Thus, if the above reactants are reacted in the presence of a thio-ether, hydroxy sulphonium sulphonates are formed. The reaction, the mechanism of which is not entirely known, apparently consists of the above-mentioned esterification reaction accompanied by the simultaneous addition of thio-ether. The general reaction when reacting one molecular proportion of ethylene oxide with a sulphonic acid in the presence of a thio-ether may be represented as follows: R represents appropriate organic radicals.

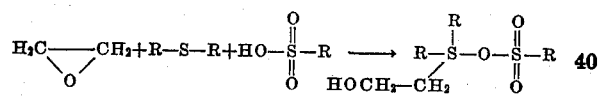

This reaction is generally applicable to all thio-ethers, i. e., compounds containing the structural formula $R_1$—S—$R_2$ wherein $R_1$ and $R_2$ represent the same or different aliphatic, aryl, alkaryl, aralkyl, and cyclo-paraffinic radicals. The thio-ethers may also contain substituted groups such as halogen atoms, nitrate groups, etc. Examples of a few applicable thio-ethers are methyl cetyl sulphide, ethyl cetyl sulphide, methyl dodecyl sulphide, methyl cresyl sulphide, β hydroxyethyl cetyl sulphide, β chlorethyl dodecyl sulphide, ethyl p-tertiary-butyl-phenoxy isopropyloxy isopropyl sulphide, amyl p-tertiary-butyl phenyl sulphide, ethyl cyclohexyl sulphide, di-beta-naphthoxy ethoxyethyl sulphide, di-phenoxyethoxyethyl sulphide, di-p-cyclohexyl phenoxy ethoxyethyl sulphide, di-tetrahydrofurfuryl ethoxyethyl sulphide, the thiuram monosulphides, etc.

When reacting a sulphonic acid with an olefine oxide compound, with or without the presence of a thio-ether, according to the present invention, the character of the product depends to a considerable extent upon the molecular ratio of the olefine oxide compound used. Although only one olefine oxide group is actually esterified by each sulphonic acid group, the olefine oxide compound usually combines to form a chain connected through ether linkages. For example, when reacting ethylene oxide with a sulphonic acid the reaction may be represented as follows:

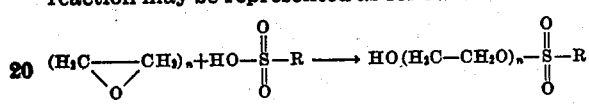

By varying the relative quantities of olefine oxide compound and sulphonic acid it is possible to control to a certain extent the production of products with a higher or lower solubility in hydrophillic or lipophillic solvents. In view of the free hydroxyl groups present in the present products and also to some extent to the slight polarity of the ether linkages the present products have, in general, a very desirable range of solubility.

The above reactions proceed at various rates depending upon the nature of the reactants. In some cases, where the reaction is fairly fast, satisfactory results may be obtained when executing the reaction at as low a temperature as $-10°$ C. while in other cases, where the reaction is quite slow, a temperature as high as about 200° C. may be desirable. In most cases, however, the reactions are most conveniently executed at moderately elevated temperatures, such as, for instance, from about 60° C. to about 100° C.

If desired, a solvent or dispersing medium may be employed. The use of a solvent, although usually not essential, tends to make the reaction proceed smoother and may be of advantage when the reactant mixture contains solid lumps, or is a viscous liquid. In general, any of the inert solvents or diluents such as aliphatic or aromatic hydrocarbons, ethers, chlorinated hydrocarbons, etc., may be used. After completion of the reaction, the solvent or diluent may be recovered by distillation.

In order to avoid loss by evaporation, etc., it is usually preferable to execute the reaction in a closed vessel. Under these conditions, if the temperature is somewhat high, or if a low-boiling reactant or diluent is present, a small amount of pressure is automatically generated. This pressure is hereinafter referred to as the autogenic pressure. Pressures higher than the autogenic pressure may be used, if desired, but are of no particular advantage.

The products of the present invention are surface-active to varying degrees, depending upon the size, character, and nature and degree of substitution of the lipophillic groups present. In general, those compounds of the present invention having lipophillic groups containing twelve or more carbon atoms are excellent wetting, foaming, and emulsifying agents. Those compounds containing fewer carbon atoms in their lipophillic groups are less efficient as capillary-active agents but may find application for certain purposes. The present products, in the capacity of surface-active agents, are useful in the manufacture of lubricants, paints, metal cleaners, etc. They may, moreover, find application either alone or in admixture with other ingredients for numerous other purposes such as, for example, in treating animal and vegetable fibers, in sizing preparations, in the processes of tanning hides, in the treating of rags and pulp in the manufacture of paper, in the flotation of ores, as ingredients in cementing compositions in the manufacture of asphalt emulsions, in the preservation of wood, etc.

The present products, moreover, have, in general, a toxic nature. In general, the toxicity is quite pronounced in the substituted sulphonium sulphonates having relatively short lipophillic groups. The present compounds, since they combine a certain toxicity with varying degrees of surface activity, and have, moreover, desirable solubility characteristics, are exceptionally well suited for numerous purposes where these characteristics are desired. For example, the present products may be used in insecticidal sprays, dairy detergents, antiseptic solutions, various medicated soap compositions, etc.

The following examples, describing the preparation of a few of the present products by the process of my invention, illustrate the simplicity and practicability of my process. These examples are purely illustrative and are not to be construed as limiting my invention in any manner.

*Example I*

Water-free p-toluene sulphonic acid is heated at 100° C. in an autoclave with twice its equivalent weight of ethylene oxide. The ethylene oxide is bound completely. The reaction product is a viscous liquid having an acid figure very near 0 and a saponification number of about 210.

The product which has the formula

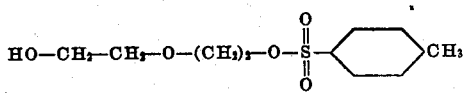

is soluble in water, ether, and benzene.

*Example II*

A mixture consisting of one mol equivalent of p-toluene sulphonic acid, two mol equivalents of ethylene oxide, and one mol equivalent of methyl cetyl sulphide, is reacted at 100° C. in an autoclave under the autogenic pressure. The crude reaction product is diluted with an excess of diethyl ether whereupon the white crystalline product is precipitated. The product having the probable formula

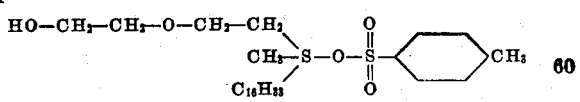

dissolves in water to give a clear solution.

*Example III* p-Toluene sulphonic acid is mixed with twice the equivalent weight of butene-1 oxide at about 10° C. with intensive stirring. Since the reaction proceeds with the evolution of considerable heat, cooling must be applied. After the reaction has apparently ceased the crude reaction product is heated for about 10 minutes at 100° C. to insure the completion of the reaction. The reaction product is a neutral viscous liquid which is practically insoluble in water, insoluble in gasoline and soluble in benzene.

*Example IV*

Oil-soluble sulphonic acids, obtained by refining mineral lubricating oil with sulphuric acid, are heated for two hours at 100° C. in an autoclave with an excess of ethylene oxide. The reaction product which is neutral and has a saponification number of about 99 is fairly soluble in water and readily soluble in benzene and mineral oil.

I claim as my invention:

1. A process for the production of surface-active sulphonates which comprises reacting a sulphonic acid with a compound containing an olefine oxide group.

2. A process for the production of surface-active sulphonates which comprises reacting a sulphonic acid with a compound containing an olefine oxide group in the substantial absence of water.

3. A process for the production of surface-active sulphonates which comprises reacting a sulphonic acid with more than one molar equivalent quantity of a compound containing an olefine oxide group, in the substantial absence of water.

4. A process for the production of surface-active sulphonates which comprises reacting a sulphonic acid with more than one molar equivalent quantity of a compound containing an olefine oxide group at a temperature from about —10° C. to about 200° C. in the substantial absence of water.

5. A process for the production of surface-active sulphonates which comprises reacting a sulphonic acid with more than one molar equivalent quantity of a compound containing an olefine oxide group at a temperature from about —10° C. to about 200° C., under the autogenic pressure and in the substantial absence of water.

6. A process for the production of surface-active sulphonates which comprises reacting a mixture of oil-soluble sulphonic acids derived from a mineral oil with more than one molar equivalent quantity of a compound containing an olefine oxide group, at a temperature from about —10° C. to about 200° C., under the autogenic pressure and in the substantial absence of water.

7. A process for the production of surface-active sulphonates which comprises reacting a mixture of oil-soluble sulphonic acids derived from a mineral oil with more than one molar equivalent quantity of an alkene oxide, at a temperature from about —10° C. to about 200° C., under the autogenic pressure and in the substantial absence of water.

8. A process for the production of surface-active sulphonates which comprises reacting a mixture of oil-soluble sulphonic acids derived from a mineral oil with more than one molar equivalent quantity of ethylene oxide, at a temperature from about —10° C. to about 200° C., under the autogenic pressure and in the substantial absence of water.

9. A process for the production of surface-active sulphonates which comprises reacting a sulphonic acid with a compound containing an olefine oxide group and a thio-ether.

10. A process for the production of surface-active sulphonates which comprises reacting a sulphonic acid with a compound containing an olefine oxide group and a thio-ether in the substantial absence of water.

11. A process for the production of surface-active sulphonates which comprises reacting a sulphonic acid with a compound containing an olefine oxide group and a thio-ether at a temperature of from about —10° C. to about 200° C., in the substantial absence of water.

12. A process for the production of surface-active sulphonates which comprises reacting a sulphonic acid with a compound containing an olefine oxide group and a thio-ether, at a temperature of from about —10° C. to about 200° C., under the autogenic pressure and in the substantial absence of water.

13. A process for the production of surface-active sulphonates which comprises reacting a mixture of oil-soluble sulphonic acids derived from a mineral oil with a compound containing an olefine oxide group and a thio-ether at a temperature of from about —10° C. to about 200° C., under the autogenic pressure and in the substantial absence of water.

14. A process for the production of surface-active sulphonates which comprises reacting a mixture of oil-soluble sulphonic acids derived from a mineral oil with an alkene oxide and a thio-ether at a temperature of from about —10° C. to about 200° C. under the autogenic pressure and in the substantial absence of water.

15. A process for the production of surface-active sulphonates which comprises reacting a sulphonic acid with a compound containing an olefine oxide group and a thio-ether, said reaction being executed at a temperature of from about —10° C. to about 200° C. under the autogenic pressure and in the substantial absence of water, and recovering a hydroxy sulphonium sulphonate from the reaction mixture.

JOHAN MARIUS HOEFFELMAN.